(12) United States Patent
Kim et al.

(10) Patent No.: US 11,388,750 B2
(45) Date of Patent: Jul. 12, 2022

(54) METHOD FOR ADJUSTING DOWNLINK LBT PARAMETER, IN WIRELESS COMMUNICATION SYSTEM SUPPORTING UNLICENSED BAND, AND DEVICE FOR SUPPORTING SAME

(71) Applicant: LG ELECTRONICS INC., Seoul (KR)

(72) Inventors: Seonwook Kim, Seoul (KR); Hanjun Park, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 818 days.

(21) Appl. No.: 16/071,390

(22) PCT Filed: Jan. 26, 2017

(86) PCT No.: PCT/KR2017/000968
§ 371 (c)(1),
(2) Date: Jul. 19, 2018

(87) PCT Pub. No.: WO2017/131476
PCT Pub. Date: Aug. 3, 2017

(65) Prior Publication Data
US 2021/0195639 A1 Jun. 24, 2021

Related U.S. Application Data

(60) Provisional application No. 62/422,606, filed on Nov. 16, 2016, provisional application No. 62/413,443, (Continued)

(51) Int. Cl.
*H04W 74/08* (2009.01)
*H04W 72/12* (2009.01)
(Continued)

(52) U.S. Cl.
CPC ... *H04W 74/0816* (2013.01); *H04W 72/1268* (2013.01); *H04W 72/14* (2013.01); *H04W 74/006* (2013.01)

(58) Field of Classification Search
CPC ......... H04W 74/0816; H04W 72/1268; H04W 74/006
See application file for complete search history.

(56) References Cited

U.S. PATENT DOCUMENTS

2015/0250002 A1  9/2015 Sun et al.
2016/0366689 A1* 12/2016 Zhang .................. H04W 16/14
(Continued)

OTHER PUBLICATIONS

3GPP TSG RAN WG1 #83 Anaheim, USA, Nov. 15-22, 2015 R1-157841 Way Forward on Channel Access for Multiple Priority Classes (Year: 2015).*
(Continued)

*Primary Examiner* — Kevin M Cunningham
(74) *Attorney, Agent, or Firm* — Lee, Hong, Degerman, Kang & Waimey PC

(57) ABSTRACT

Disclosed are a method for adjusting a downlink listen-before-talk (LBT) parameter by a base station, in a licensed assisted access (LAA) system for execution of LBT-based signal transmission by a base station or a terminal, and a device for supporting same. More particularly, disclosed are a method for uplink operation by a terminal, in a multi-carrier environment, a method for uplink transmission on the basis of same, and a device for supporting the methods.

8 Claims, 12 Drawing Sheets

Related U.S. Application Data filed on Oct. 27, 2016, provisional application No. 62/295,507, filed on Feb. 16, 2016, provisional application No. 62/289,879, filed on Feb. 1, 2016, provisional application No. 62/288,450, filed on Jan. 29, 2016.

(51) Int. Cl.
*H04W 72/14* (2009.01)
*H04W 74/00* (2009.01)

(56) References Cited

U.S. PATENT DOCUMENTS

| 2017/0005768 | A1* | 1/2017 | Yin | H04W 74/08 |
| 2017/0013469 | A1* | 1/2017 | Larsson | H04W 74/0808 |
| 2017/0019909 | A1* | 1/2017 | Si | H04W 76/28 |
| 2018/0302842 | A1* | 10/2018 | Sugirtharaj | H04W 74/0808 |

OTHER PUBLICATIONS

PCT International Application No. PCT/KR2017/000968, Written Opinion of the International Searching Authority dated Apr. 27, 2017, 16 pages.

Wilus, "Remaining issues on CWS adaptation for LBT on LAA", 3GPP TSG RAN WG1 Meeting #83, R1-157329, Nov. 2015, 3 pages.

Ericsson, et al., "WF on Regulation and MCOT", 3GPP TSG RAN WG1 Meeting #83, R1-157555, Nov. 2015, 4 pages.

Samsung, et al., "WF on MCOT for LBT priority classes", 3GPP TSG RAN WG1 Meeting #83, R1-157670, Nov. 2015, 5 pages.

3rd Generation Partnership Project (3GPP), "Technical Specification Group Radio Access Network; Study on Licensed-Assisted Access to Unlicensed Spectrum (Release 13)," 3GPP TR 36.889 V13.0.0, Jun. 2015, 88 pages.

\* cited by examiner

FIG. 9
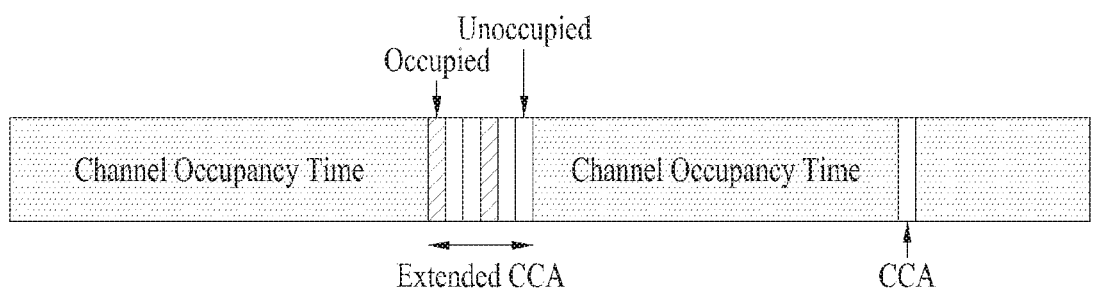
(a)
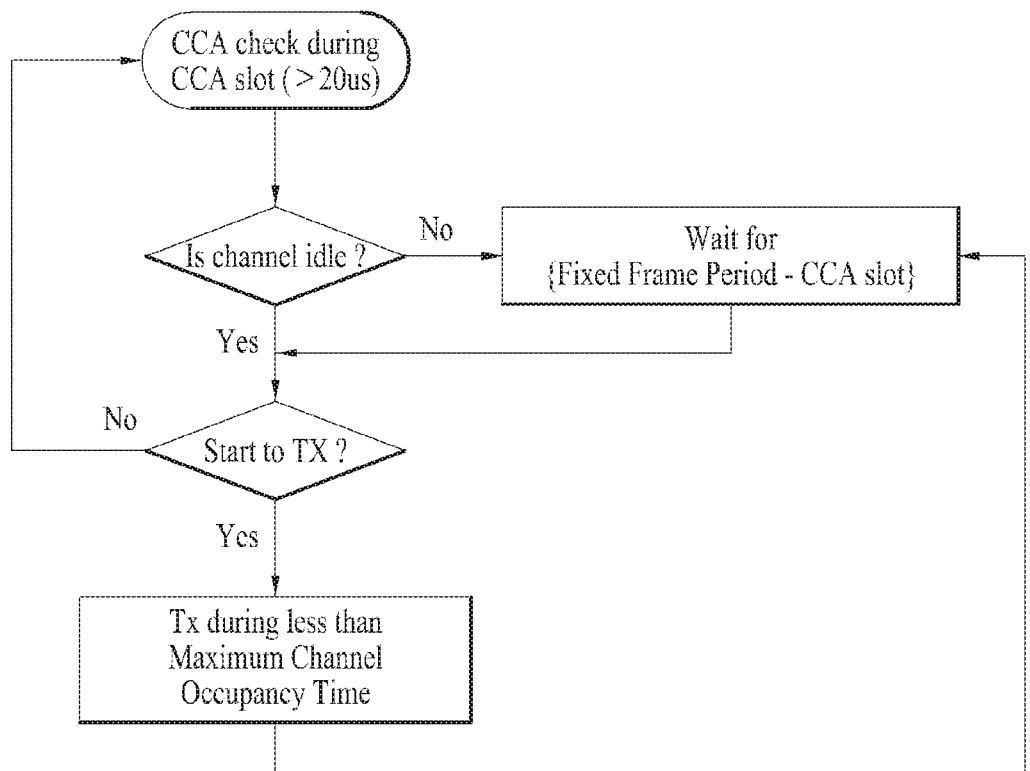
(b)

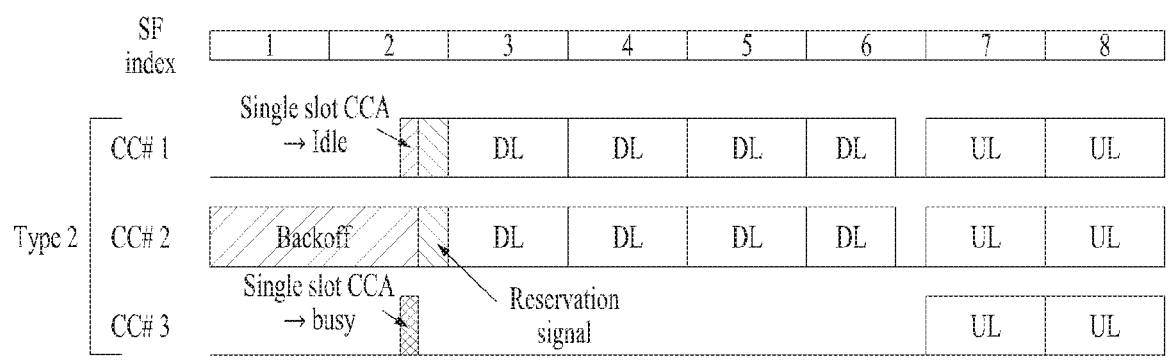

METHOD FOR ADJUSTING DOWNLINK LBT PARAMETER, IN WIRELESS COMMUNICATION SYSTEM SUPPORTING UNLICENSED BAND, AND DEVICE FOR SUPPORTING SAME

CROSS-REFERENCE TO RELATED APPLICATIONS

This application is the National Stage filing under 35 U.S.C. 371 of International Application No. PCT/KR2017/000968, filed on Jan. 26, 2017, which claims the benefit of U.S. Provisional Application No. 62/288,450, filed on Jan. 29, 2016, 62/289,879, filed on Feb. 1, 2016, 62/295,507, filed on Feb. 16, 2016, 62/413,443, filed on Oct. 27, 2016, and 62/422,606, filed on Nov. 16, 2016, the contents of which are all hereby incorporated by reference herein in their entirety.

TECHNICAL FIELD

Following description relates to a wireless communication system supporting an unlicensed band, and more particularly, to a method for a base station to adjust a downlink LBT parameter in a wireless communication system supporting an unlicensed band and apparatuses supporting the method.

And, following description relates to an uplink operating method of a UE in multi-carrier environment, an uplink transmission method based on the uplink operating method of the UE, and apparatuses supporting the methods.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

When a base station or a UE performs LBT (listen-before-talk)-based signal transmission, an object of the present invention is to provide a method for the base station to adjust a downlink LBT parameter.

In particular, an object of the present invention is to provide a method for a base station to adjust a downlink LBT parameter when multi-carrier (or multi-channel) transmission is performed.

When multi-carrier (or multi-channel) transmission is performed, another object of the present invention is to provide a detail LBT method which is performed by a UE to perform uplink multi-carrier transmission and an efficient uplink transmission method based on the LBT method.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for a base station to adjust a downlink LBT parameter in a wireless communication system supporting an unlicensed band and apparatuses supporting the method.

To achieve these and other advantages and in accordance with the purpose of the present invention, as embodied and broadly described, according to one embodiment, a method of adjusting a downlink LBT (listen-before-talk) parameter, which is adjusted by a base station in a wireless communication system supporting an unlicensed band, includes the steps of performing downlink LBT on a plurality of carriers and transmitting a downlink signal on one or more carriers based on a result of downlink LBT according to each carrier, and when a downlink signal including an uplink grant without PDSCH (physical downlink shared channel) is transmitted to one or more UEs during MCOT (maximum channel occupancy time) occupied (or secured) by the base station, increasing downlink CWS (contention window size) values corresponding to all downlink LBT classes in condition where less than 10% of uplink transport blocks are successfully received among uplink transport blocks scheduled to the one or more UEs.

To further achieve these and other advantages and in accordance with the purpose of the present invention, according to a different embodiment, a base station transceiving a signal with a UE in a wireless communication system supporting an unlicensed band includes a receiver, a transmitter, and a processor configured to operate in a manner of being connected with the receiver and the transmitter, the processor configured to perform downlink LBT on a plurality of carriers and transmit a downlink signal on one or more carriers based on a result of downlink LBT according to each carrier, the processor, when a downlink signal including an uplink grant without PDSCH (physical downlink shared channel) is transmitted to one or more UEs during MCOT (maximum channel occupancy time) occupied (or secured) by the base station, configured to increase downlink CWS (contention window size) values corresponding to all downlink LBT classes in condition where less than 10% of uplink transport blocks are successfully received among uplink transport blocks scheduled to the one or more UEs.

In this case, the performing downlink LBT performed on a plurality of the carriers comprises performing backoff-based LBT on a single carrier among a plurality of the carriers and performing LBT for determining whether or not a corresponding carrier is idle for more than prescribed time on the remaining carriers among a plurality of the carriers.

For example, the scheduled uplink transport blocks may correspond to uplink transport blocks scheduled to carriers on which a downlink signal is actually transmitted by the base station among a plurality of the carriers.

As a different example, the scheduled uplink transport blocks may correspond to uplink transport blocks scheduled to a plurality of the carriers.

And, when a downlink signal including an uplink grant without PDSCH is transmitted to the one or more UEs during MCOT (maximum channel occupancy time) secured by the base station, the base station can reset downlink CWS values corresponding to all downlink LBT classes in condition where more than 10% of uplink transport blocks are successfully received among uplink transport blocks scheduled to the one or more UEs.

And, the downlink signal including the uplink grant without the PDSCH, which is transmitted to the one or more UEs by the base station, can indicate an LBT type attempting to transmit an uplink signal when a corresponding channel is in an idle state for prescribed time.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a base station is able to more efficiently adjust an LBT parameter for multi-channel LBT in a wireless access system supporting an unlicensed band.

According to a different configuration of the present invention, a UE is able to more efficiently perform multi-channel LBT and is able to more efficiently perform uplink transmission based on the multi-channel LBT.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary Load Based Equipment (LBE) operation as one of the LBT operations;

FIG. 12 is a diagram illustrating an example of independently applying scheduling according to a carrier to a plurality of UEs;

FIG. 13 is a diagram illustrating a multi-carrier LBT operation of an eNB according to the present invention;

BEST MODE

Mode for Invention

Figure 1:
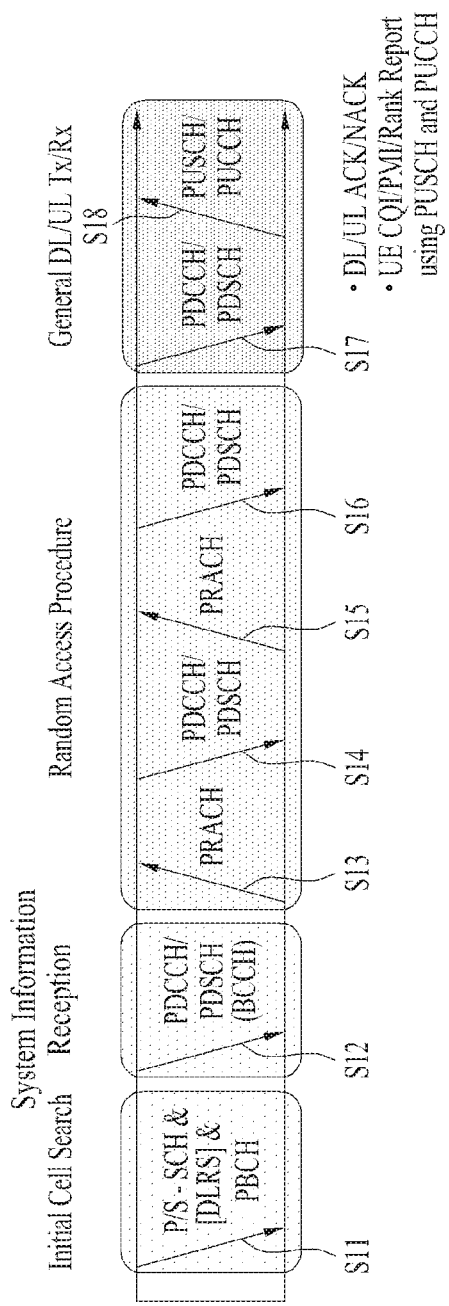
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
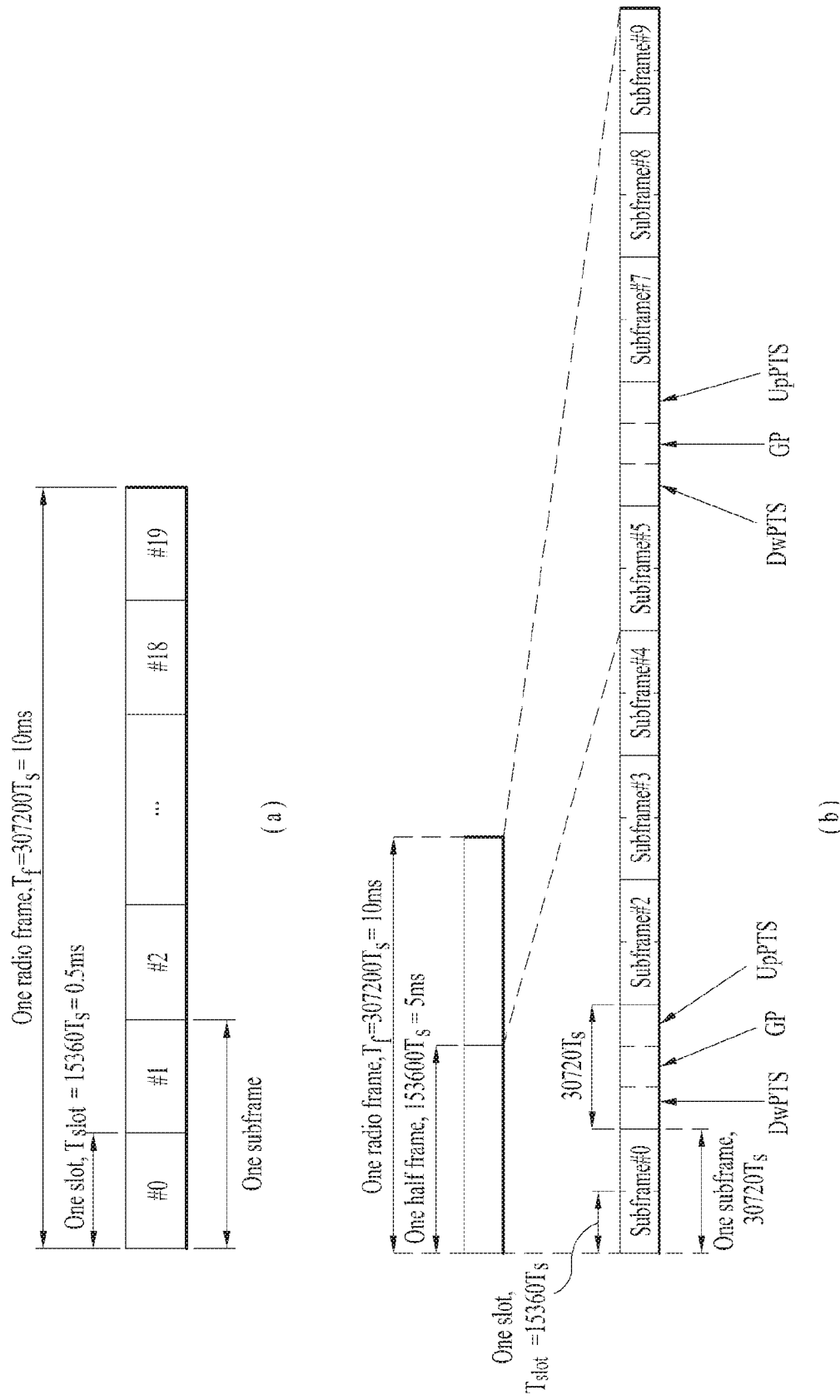
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
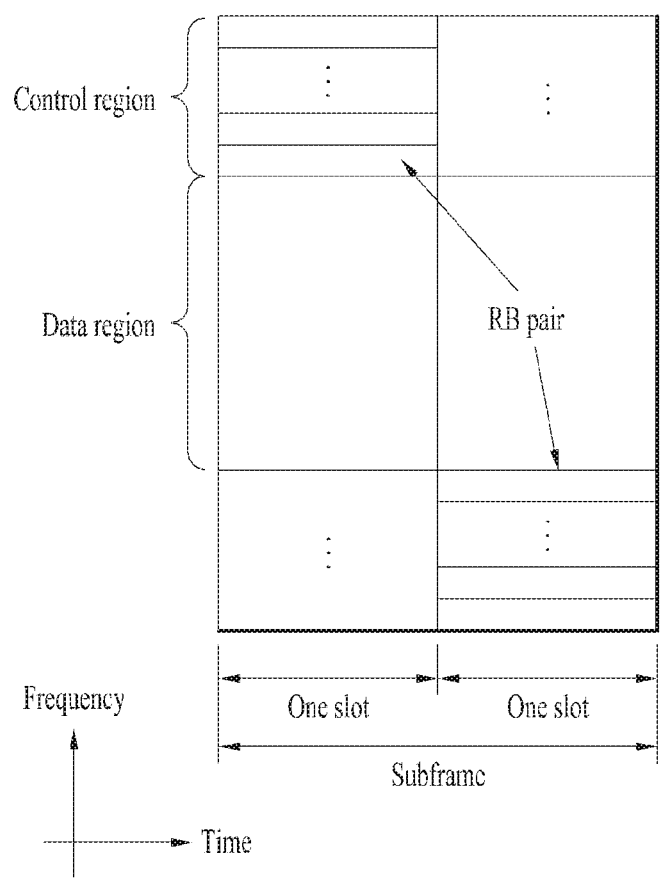
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
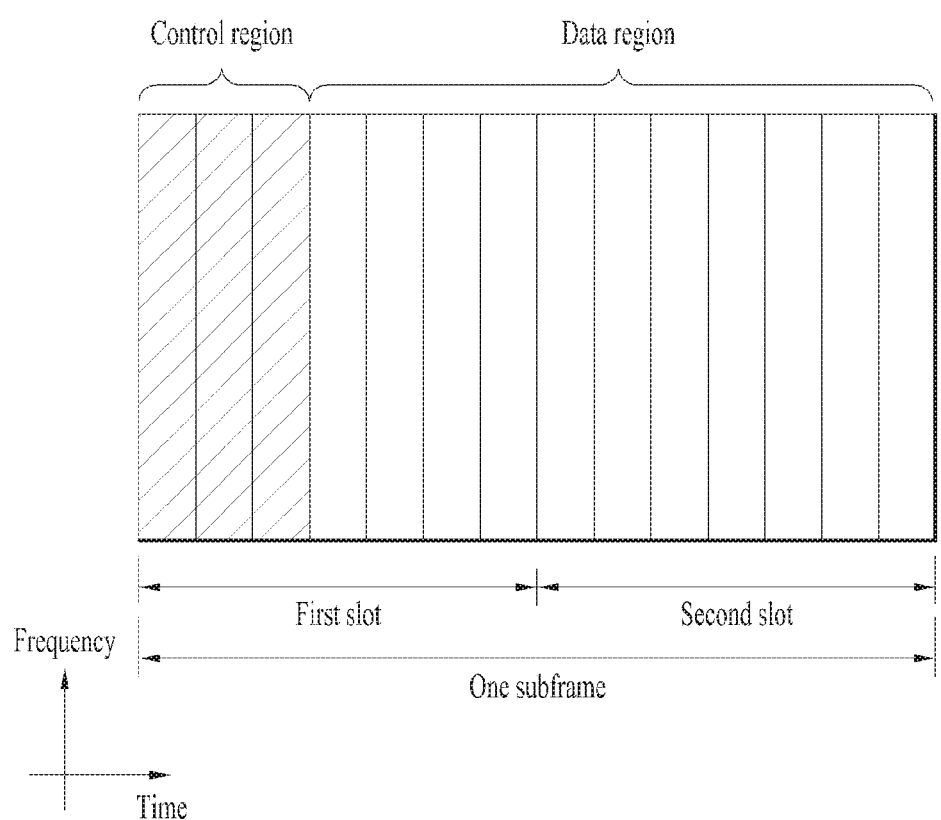
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
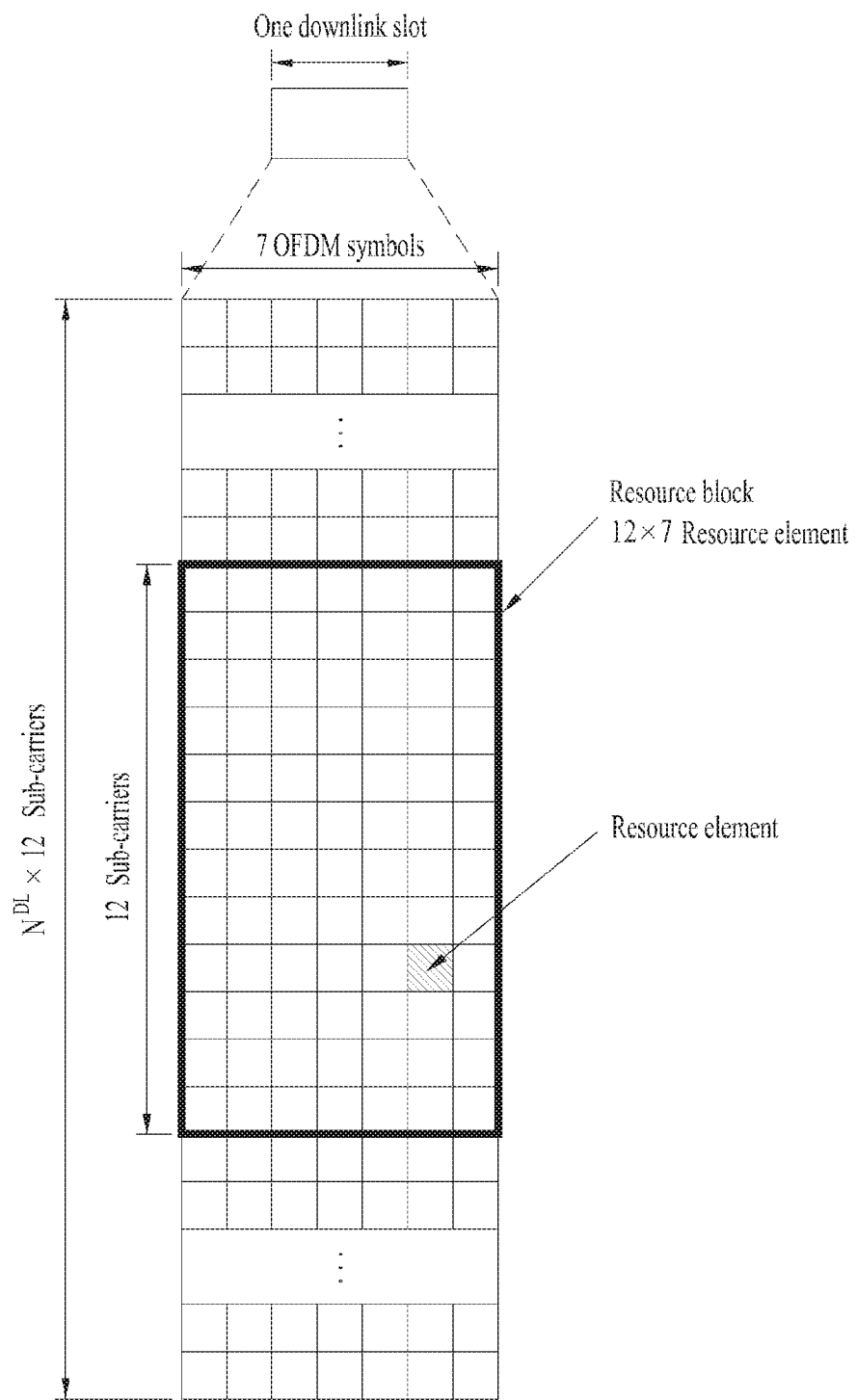
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
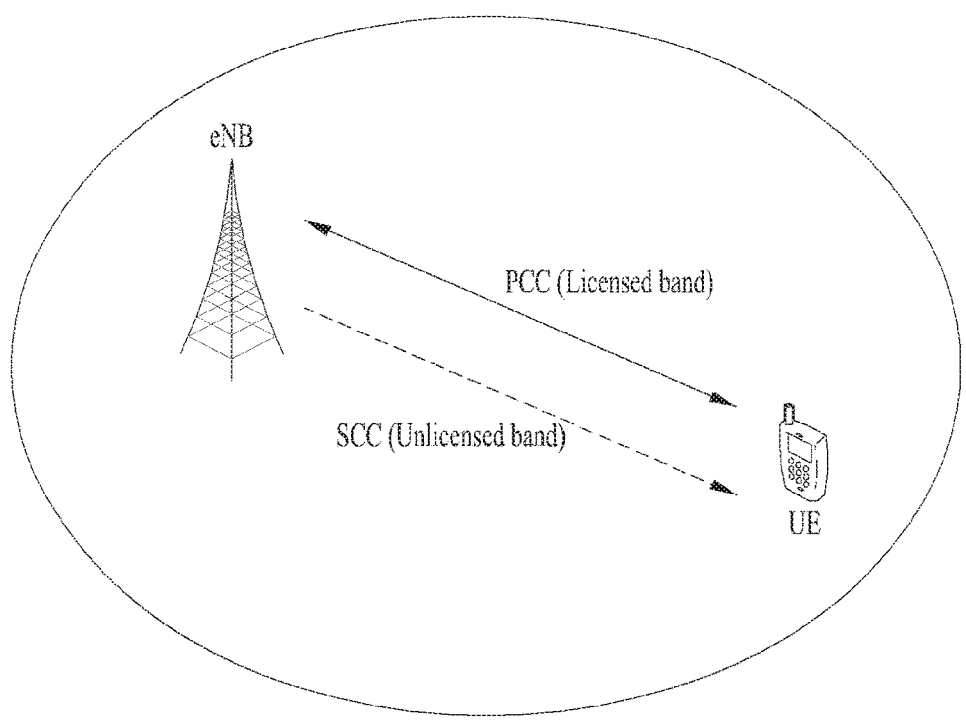
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
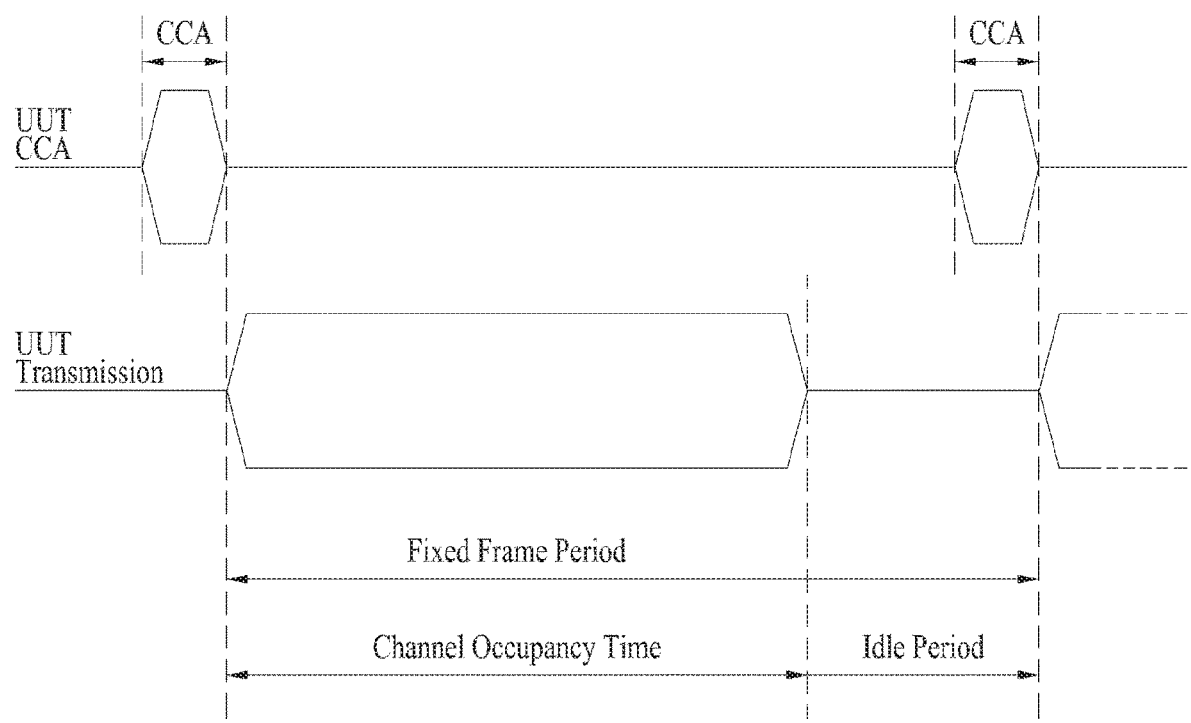
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 µs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
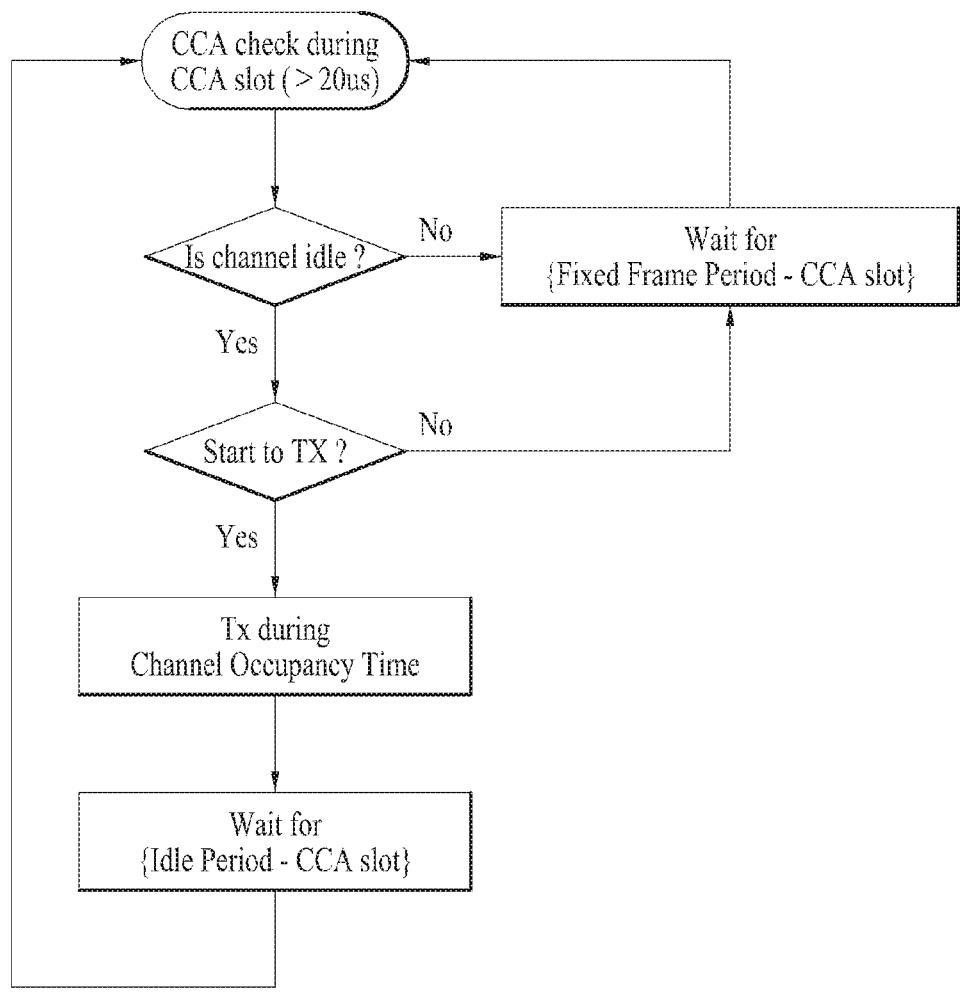
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 9 is a view illustrating an exemplary LBE operation as one of the LBT operations.

Referring to FIG. 9(a), in LBE, the communication node first sets q ($q \in \{4, 5, \ldots, 32\}$) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N ($N \in \{1, 2, \ldots, q\}$) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
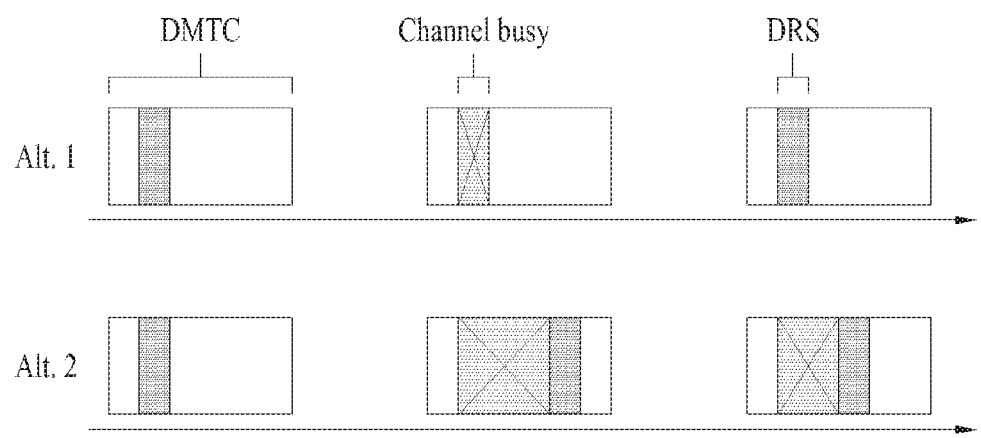
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
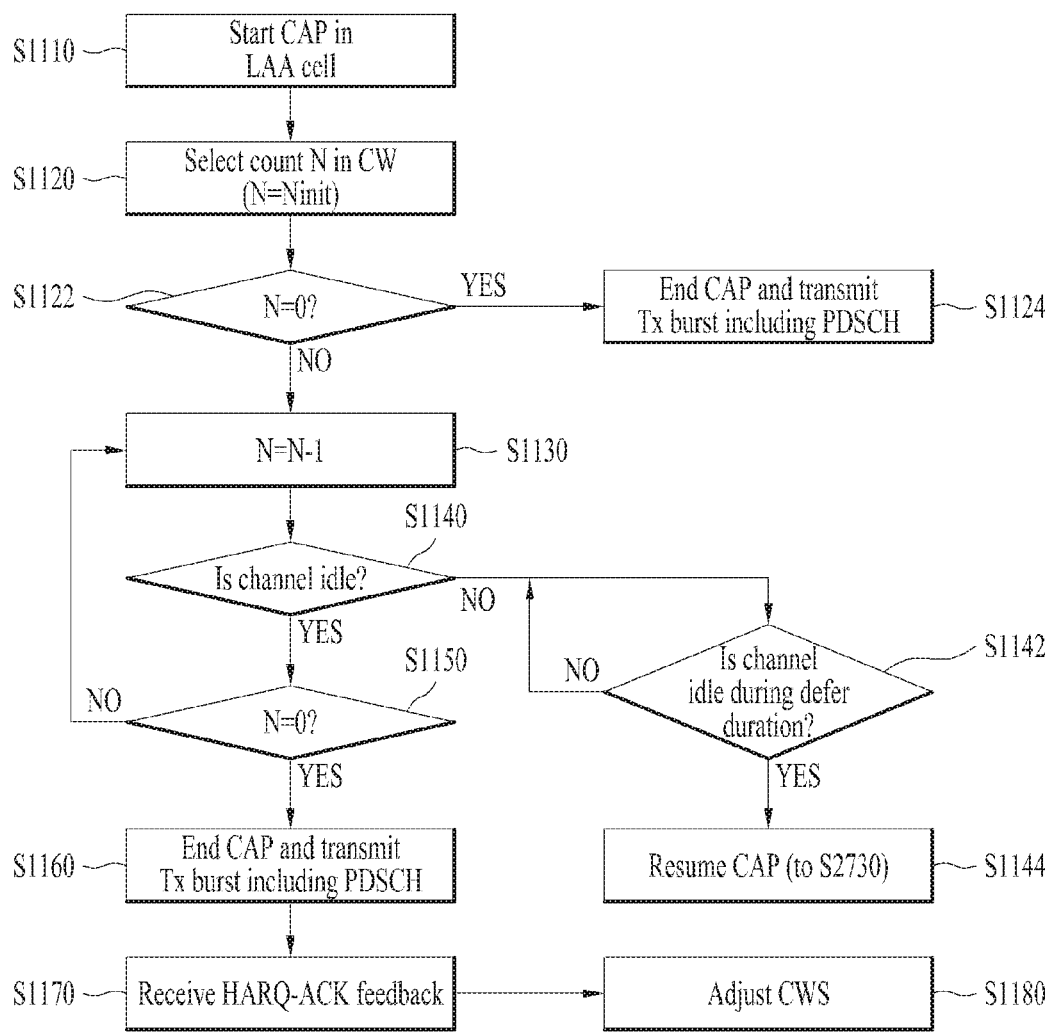
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to CWp.

Subsequently, if the back-off counter value (N) corresponds to 0 [S1122], the base station terminates the CAP and performs Tx burst transmission including PSCH [S1124].

On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Unlike a licensed band, an unlicensed band includes a considerable amount of spectrum resources. In particular, 5 GHz band can be mainly divided into 4 frequency bands and each of the frequency bands is configured by 5150-5350, 5470-5725, 5725-5850, and 5850-5925 MHz. In this case, it may be able to utilize a frequency resource of 100 to 200 MHz according to each frequency band.

Since a maximum bandwidth supported by LTE system corresponds to 20 MHz, if an RF is separately configured in a unit of 20 MHz at the time of implementing an eNB or a UE, it may cost a lot. Hence, it is economically preferable to design a single RF module to be shared by at least a frequency band or whole band of 5 GHz.

However, if the whole band of 5 GHz is designed by a single RF element, although there are many available component carriers (CCs) in a unit of 20 MHz on a corresponding frequency band, an eNB or a UE may fail to efficiently use each of the CCs. Since an unlicensed band operates based on contention, an eNB or a UE should perform an LBT operation before transmitting a signal via a specific CC. In this case, if a signal is already transmitted on a different CC of 5 GHz band, (since a common RF element is used) the eNB or the UE is unable to perform LBT on the CC and is unable to transmit a signal. In other word, since signal transmission and signal reception are not permitted at the same time on CCs using the same RF, the eNB or the UE can efficiently transmit a signal by aligning transmission timing between CCs.

The present invention proposes a transmission method in multi-CC environment and an LBT operation method in an uplink unlicensed band.

3.1 Half-Duplex Operation

If it is assumed that a UE operates with a single RF on 5 GHz, the UE is unable to simultaneously perform transmission and reception. Hence, the present invention proposes a UE operation as follows in consideration of the UE.

3.1.1 Proposal 1

When there is an SF #n in which UL data (e.g., PUSCH/PUCCH/DM-RS/SRS, etc.) is to be transmitted (scheduled) for at least one cell among configured (or activated) LAA Scell(s), a UE may not expect DL reception in all activated LAA Scells at the SF #n.

3.1.2 Proposal 2

When there is an SF #n in which UL data (e.g., PUSCH/PUCCH/DM-RS/SRS, etc.) is to be transmitted (scheduled) for at least one cell among configured (or activated) LAA Scell(s), if a UE attempts to perform UL transmission including a first slot of the SF #n, the UE may not expect DL reception in all activated LAA Scells at the SF #n.

For example, if a UE fails to perform LBT for transmitting an SF #n, the UE does not attempt to transmit UL data, and the SF #n is configured by a DL initial partial subframe, the UE may expect to receive an initial partial subframe in a second slot of the SF #n.

As a different example, when a UE fails to perform LBT in an SF #n and does not attempt to transmit UL data in the SF #n, if the UE receives signaling indicating that the SF #n is configured by a UL initial partial subframe or the SF #n is permitted by a UL initial partial subframe, the UE may not expect DL reception in all activated LAA Scells at the SF #n. Instead, the UE can perform LBT in the SF #n to transmit the UL initial partial subframe.

3.1.3 Proposal 3

When there is an SF #n in which UL data (e.g., PUSCH/PUCCH/DM-RS/SRS, etc.) is to be transmitted (scheduled) for at least one cell among configured (or activated) LAA Scell(s) and an SF #n−1 of a cell corresponds to a DL subframe, a UE does not expect information on a length of the SF #n in a common PDCCH of the SF #n−1. In particular, the UE does not expect to receive the common PDCCH including the information on the length of the SF #n in all activated LAA Scells in the SF #n−1.

3.1.4 Proposal 4

When there is an SF #n in which UL data (e.g., PUSCH/PUCCH/DM-RS/SRS, etc.) is to be transmitted (scheduled) for at least one cell among configured (or activated) LAA Scell(s) and an SF #n−1 of a cell corresponds to a DL subframe, if information on a length of the SF #n is received in a common PDCCH of the SF #n−1, a UE can determine whether or not the UL data is transmitted in the SF #n according to the length of the SF #n.

For example, if the length of the SF #n is equal to or less than X symbols, the UE may attempt to transmit an SRS or may attempt to perform LBT for transmitting the SRS.

As a different example, if the length of the SF #n is equal to or less than Y symbols and signaling indicating that the SF #n is configured by a UL initial partial subframe or the SF #n is permitted by a UL initial partial subframe is received, a UE may attempt to transmit PUSCH/PUCCH or may attempt to perform LBT for transmitting the PUSCH/PUCCH.

As a further different example, if the length of the SF #n is equal to or less than Z symbols and signaling indicating that a timing gap equal to or greater than W symbols is configured at a symbol positioned at the fore part of a UL subframe is received, a UE may attempt to transmit PUSCH/PUCCH or may attempt to perform LBT for transmitting the PUSCH/PUCCH.

3.2 Multi-Channel LBT Types

Rel-13 LAA system mainly defines two LBT types for DL multi-channel LBT. One is a category 4-based LBT type (hereinafter, type 1) (of which a CWS (contention window size) varies) individually applied to carriers on which DL transmission is to be performed and another is an LBT type (hereinafter, type 2) that a category 4-based LBT is operated on a single carrier only among carriers on which DL transmission is to be performed and a transmission is initiated on the remaining carriers when the remaining carriers are idle for more than prescribed time (e.g., 25 us) only. The type 2 multi-channel LBT includes a type 2-1 multi-channel LBT that the same CWS value is applied to all carrier groups and a type 2-2 multi-channel LBT that a CWS value is independently applied to each carrier.

It may consider the two LBT methods in performing UL transmission. Hence, other available multi-channel LBT types and detail methods for each LBT type are proposed in the present paragraph.

(1) Type A

Similar to the DL LBT type of the aforementioned type 1, a UE can perform category 4-based LBT on each of all carriers on which UL transmission is to be performed. In this case, a method of configuring a backoff counter is explained in detail in the next paragraph.

(2) Type B

Similar to the aforementioned LBT type of the type 2, a UE can perform category 4-based LBT on a single carrier only among carriers on which UL transmission is to be attempted. In this case, the carrier on which the category 4-based LBT is performed can be matched with all UEs or a UE group. In case of considering a dual connectivity situation that non-ideal backhaul is assumed between an LAA Scell eNB and an L-cell eNB, a UE can be configured to perform the category 4-based LBT on a carrier configured as a pScell among LAA SCells. In this case, a method of adjusting a CWS is explained in detail in the following paragraph.

(3) Type C

If it is determined that each of carriers on which UL transmission is to be attempted is idle for more than prescribed time (e.g., 25 us), a UE can be configured to perform UL transmission initiating LBT.

(4) Type D

It may be able to configure a partial carrier (or all carriers) not to perform LBT on the aforementioned types of LBT.

Besides the aforementioned types of LBT, there may exist LBT types for UL multi-channel transmission. A type of multi-channel LBT to be performed by a UE among the LBT types for UL multi-channel transmission can be configured via RRC signaling. Or, a type of multi-channel LBT to be performed by each UE can be dynamically signaled via common PDCCH, PHICH, or UE-specific DCI.

And, a type of LBT to be performed among the aforementioned type of LBT and the LBT type for multi-channel transmission can be configured based on scheduling information according to a carrier. For example, when an eNB schedules UL data transmission in a specific LAA Scell, the eNB can indicate a UE to perform category 4-based LBT by signaling a backoff counter or a CWS value to the UE. Or, the eNB can indicate the UE to perform the category 4-based LBT or transmission initiating LBT when a channel is idle for more than prescribed time (e.g., 25 us) only. Or, when a UE receives a UL grant via cross-carrier scheduling and attempts to transmit UL data in response to the UL grant, the UE is configured to perform the category 4-based LBT. When a UE receives a UL grant via self-carrier scheduling and attempts to transmit UL data in response to the UL grant, the UE is configured to perform the transmission initiating LBT when a channel is idle for more than prescribed time (e.g., 25 us) only.

The UE can determine LBT to be performed on a certain carrier via the abovementioned method among the category 4-based LBT and the transmission initiating LBT when a channel is idle for more than prescribed time (e.g., 25 us). For example, if the category 4-based LBT is configured to be performed on the M number of carriers and the transmission initiating LBT is configured to be performed on the N number of carriers in the aspect of a UE, it may be able to apply a multi-channel access procedure of a type A, a type B, and a type C according to a combination of an M value and an N value.

Type A: can be applied when M>0 and N=0 are satisfied.

Type B: can be applied when M=1 and N>0 or M>0 and N>0 are satisfied. Specifically, when M>0 and N=0 are satisfied, if a carrier is selected according to a predetermined rule or a rule configured via higher layer signaling or a UE randomly selects a carrier from among the M number of carriers, the UE performs the category 4-based LBT on the selected carrier. The UE can perform the transmission initiating LBT, which is performed when a channel is idle for more than prescribed time (e.g., 25 us) only, on the M−1 number of carriers. In particular, it may be able to apply a multi-channel access procedure of the type B.

Type C: can be applied when M=0 and N>0 are satisfied.

The present invention additionally proposes an operation for a case that M>1 and N>0 are satisfied.

<Alternative 1>

If a carrier is selected according to a predetermined rule or a rule configured via higher layer signaling or a UE randomly selects a carrier from among the M number of carriers, the UE performs the category 4-based LBT on the selected carrier. The UE can perform the transmission initiating LBT, which is performed when a channel is idle for more than prescribed time (e.g., 25 us) only, on the M+N−1 number of carriers. In particular, it may be able to apply a multi-channel access procedure of the type B.

<Alternative 2>

When a UE performs a multi-channel access procedure of the type A on the M number of carriers and starts signal transmission on the M number of carriers or a part of the carriers, the UE can perform multi-channel LBT to attempt to perform simultaneous transmission on the N' (<=N) number of carriers where a channel is idle for more than prescribed time (e.g., 25 us) only from the timing at which the signal transmission starts.

<Alternative 3>

It may be able to configure mapping between a carrier on which category 4-based LBT is performed according to a predetermined rule or a rule configured via higher layer signaling or the carrier randomly selected by a UE and a carrier on which transmission initiating LBT, which is performed when a channel is idle for more than prescribed time (e.g., 25 us) only. In this case, if the UE performs a multi-channel access procedure of the type A on the M number of carriers and starts transmission on the M number of carriers or a part of the carriers, the UE can perform multi-channel LBT to attempt to perform simultaneous transmission on carriers where a channel is idle for more than prescribed time (e.g., 25 us) only from the timing at which the transmission starts.

In the alternatives 1 to 3, if it is determined that a channel is idle for more than prescribed time (e.g., 25 us) only, it may be able to configure signal transmission initiating LBT not to be performed on a part of carriers. For example, if it is determined that a channel is idle for more than prescribed time (e.g., 25 us) only, it may be able to configure a UE to perform the transmission initiating LBT on a part of the M+N−1 number of carriers and configure the UE not to perform LBT on the remaining carriers.

A UE can signal the number of carriers (K number of carriers) on which the category 4-based LBT is performed at the same time as UE capability. When an eNB indicates a UE to perform LBT of the type A, if the eNB signals 2 to the UE as a K value, the UE can transmit a signal by performing carrier aggregation on maximum 2 carriers only among LAA Scell of an unlicensed band.

3.3 CWS and Backoff Counter Configuration

3.3.1 Type A

As mentioned earlier in the type A, if the category 4-based LBT is performed on all carriers, it is preferable to adjust a CWS according to a carrier. When a backoff counter value is randomly selected from among updated CWSs, a UE can individually selects a backoff counter value (Type A1) according to a carrier or may select a backoff counter value common to all carriers (Type A2). In this case, multi-channel LBT of a type to be performed by the UE among the Type A1 and the Type A2 can be configured via RRC signaling or physical layer signaling. Or, the multi-channel LBT of a type to be performed by the UE can be randomly selected by the UE.

When a backoff counter value (or CWS value) is directly signaled on each carrier, a UE performing the Type A1 may expect that a common backoff counter value (or CWS value) is always indicated. If different backoff values are indicated, the UE can be configured to perform LBT using a maximum value (or minimum value, a representative value resulted from rounding off an average value) among the backoff values. When CWS values are directly signaled (when information related to a CWS (increase/decrease of a CWS)) on each carrier, a UE performing the Type A1 can be configured to (randomly) select a common backoff counter value by applying the maximum CWS among the signaled CWSs. If a UE autonomously adjusts a CWS without specific signaling for CWS adjustment, a UE performing the Type A1 can be configured to randomly select a backoff counter value on the basis of the maximum CWS among CWSs of carriers on which transmission is to be performed.

When the multi-channel LBT of the Type A is performed on a plurality of carriers, if transmission starts on a part of carriers only and a backoff counter value is frozen on the remaining carriers, a UE terminates the transmission and may utilize the frozen backoff counter when LBT is performed for a new transmission.

In this case, in case of the UL multi-channel LBT, when LBT is performed for a new transmission, it may be able to configure the frozen backoff counter value to be reset all the time. Or, if a UE receives a backoff counter value (or CWS value) via a UL grant, a common PDCCH, or PHICH, the frozen backoff counter value is reset. If the UE fails to receive the signaling, the UE can start LBT from the frozen backoff counter value (after at least T us is elapsed).

3.3.2 Type B

According to Type B LBT, since a backoff counter operates by one, similar to the paragraph 3.3.1, no special issue exists in a method of configuring a backoff counter value. However, it may consider a method of appropriately adjusting a CWS in consideration of a collision situation of a plurality of carriers. In particular, if it is assumed that an eNB separately adjust a CWS according to a UE, it may apply methods of adjusting a CWS of two types described in the following.

3.3.2.1 First Type B

An eNB can independently adjust CWSs according to a carrier of a specific UE and the specific UE can perform category 4-based LBT by applying a biggest CWS among the CWSs.

FIG. 12 is a diagram illustrating an example of independently applying scheduling according to a carrier to a plurality of UEs.

As shown in FIG. 12, when an SF #n is scheduled to a plurality of UEs (UE #1, UE #2, and UE #3), a method of configuring a CWS is explained in detail in the following.

First of all, each of the UEs can perform UL LBT by applying a biggest CWS. In particular, the UE #2 can perform LBT by applying a bigger CWS among CWSs of a CC #1 and a CC #2 and the UE #3 can perform LBT by applying a bigger CWS among CWSs of a CC #2 and a CC #3.

In this case, in the aspect of a UE, if a CWS is individually allocated, it is not advantageous in terms of FDM (frequency division multiplexing), MU-MIMO (multi-user multi input multi output), and inter-cell frequency reuse. Hence, it may be preferable to synchronize CWSs or backoff counter values between UEs.

Hence, an eNB or a UE can configure a representative CWS value according to a UE scheduled in accordance with a carrier. For example, in FIG. 12, a representative CWS of the CC #1 is configured by a maximum value among CWSs of the UE #1 and the UE #2, a representative CWS of the CC #2 is configured by a maximum value among CWSs of the UE #2 and the UE #3, and a representative CWS of the CC #3 can be configured by a maximum value among CWSs of the UE #3.

Or, an eNB preferentially determines a representative CWS according to a UE and can configure a representative CWS according to a UE scheduled in accordance with a carrier. For example, in FIG. 12, a representative CWS of the UE #1 is configured by a CWS of the CC #1, a representative CWS of the UE #2 is configured by a maximum value among CWSs of the CC #1 and the CC #2, and a representative CWS of the UE #3 is configured by a maximum value among CWSs of the CC #2 and the CC #3. Since the CC #1 is scheduled to the UE #1 and the UE #2, a representative CWS value of the CC #1 is configured by a maximum value among CWSs of the UE #1 and the UE #2 and a representative CWS value of the CC #2 can be configured by a maximum value among CWSs of the UE #1 and the UE #2. A representative CWS value of the CC #3 can be determined in consideration of a CWS value of the UE #3 only.

3.3.2.2 Second Type B

An eNB adjusts a CWS according to a UE. If a specific UE is scheduled to all carriers, the eNB can configure a common CWS to the carriers. In this case, a CWS of each UE can be adjusted using reference subframes of all carriers.

Similar to the first type B, it may be preferable to synchronize CWSs or backoff counter values between UEs in the second type B as well. In particular, a representative CWS value according to a carrier can be configured according to a UE scheduled according to a carrier. For example, in FIG. 12, a representative CWS value of the CC #1 is configured by a maximum value among CWSs of the UE #1 and the UE #2, a representative CWS value of the CC #2 is configured by a maximum value among CWSs of the UE #2 and the UE #3 and a representative CWS value of the CC #3 can be configured by a CWS value of the UE #3.

3.4 Maximum Frequency Separation when Multi-Carrier Transmission is Performed In Rel-13 LAA system, when LAA system and WiFi coexist and the number of LAA Scells capable of being transmitted at the same time corresponds to maximum 4, center frequency separation between two carriers on which actual transmission is attempted is restricted to maximum 62 MHz. This is because, since WiFi is able to perform contiguous transmission on maximum 80 MHz band, it is necessary to set a maximum transmission band of the LAA system to about 80 MHz.

In case of introducing not only LAA system of which a system band corresponds to 20 MHz but also LAA system of which a system band corresponds to 10 MHz to 5 GHz band, a center frequency of the 10 MHz LAA system can be configured using three methods described in the following.

(1) A center frequency of the 10 MHz LAA system can be configured by a value identical to a center frequency of the 20 MHz LAA system.

(2) A center frequency of the 10 MHz LAA system can be configured by a rule identical to a center frequency configuration of the 20 MHz LAA system although it is irrespective of the center frequency of the 20 MHz LAA system. In particular, it may be able to permit a center frequency exactly matched with a center frequency of WiFi or a center frequency nearby 100 kHz or 100 kHz (or 300 kHz) only.

(3) A center frequency can be configured in a manner that maximum two 10 MHz LAA systems are included in 20 MHz band used by WiFi. For example, a center frequency of one 10 MHz LAA system is set to F1+10 MHz+100 kHz, F1+10 MHz−100 kHz, F1+10 MHz+200 kHz, or F1+10 MHz−200 kHz and a center frequency of another 10 MHz LAA system can be set to F1−10 MHz+100 kHz, F1−10 MHz−100 kHz, F1−10 MHz+200 kHz, or F1−10 MHz−200 kHz on the basis of the center frequency F1 of WiFi.

According to the methods (1) and (2), similar to the legacy method, when LAA system and WiFi coexist and the number of LAA Scells capable of being transmitted at the same time corresponds to maximum 4 (or 8), center frequency separation between two carriers on which actual transmission is attempted can be restricted to maximum 62 MHz.

On the contrary, according to the method (3), when LAA system and WiFi coexist and the number of LAA Scells capable of being transmitted at the same time corresponds to maximum 4 (or 8), center frequency separation between two carriers on which actual transmission is attempted can be restricted to maximum 72 MHz (or 70+N MHz).

And, in case of considering a dual connectivity situation that non-ideal backhaul is assumed between an LAA Scell eNB and an L-cell eNB, if it fails to perform UL LBT on a carrier configured as pScell among LAA Scells during T1 ms (e.g., T1=100) or if it fails to continuously transmit PUSCH (or PUCCH/SRS) N times due to the failure of LBT, an event of a radio link failure (RLF) is triggered. If the RLF is reported to a PCell, UL transmission may not be configured in LAA Scell.

3.5 CWS Adjustment when MCOT is Shared

In Rel-13 LAA system, when an eNB occupies a channel via random backoff LBT, maximum channel occupancy time is restricted according to an LBT priority class. And, Rel-14 eLAA system has introduced an operation of sharing a channel occupied by an eNB with a UE associated with the eNB. In this case, when the UE shares a channel with the eNB, it may allow the UE to perform an LBT operation of sensing a channel state during prescribed time only rather than a random backoff LBT operation. Although the eNB performs DL multi-carrier LBT of the type 2, an operation of sharing a channel occupied by the eNB can be extensively applied.

FIG. 13 is a diagram illustrating a multi-carrier LBT operation of an eNB according to the present invention.

As shown in FIG. 13, when an eNB transmits DL data by performing type 2 multi-carrier LBT on CCs #1, #2, and #3, the eNB can perform random backoff LBT on the CC #2 only.

In this case, if the eNB performs the random backoff using an LBT parameter corresponding to an LBT priority class 3, the eNB can occupy a channel having a length of maximum 8 msec.

For example, when random backoff of the CC #2 ends, if the CC #1 attempts to perform simultaneous transmission because a channel is idle and the CC #3 fails to attempt to perform simultaneous transmission because a channel is busy, channel occupancy of the eNB during 8 msec can be applied to all CCs belonging to the same carrier group irrespective of an LBT result of the eNB. The channel occupancy of the eNB can also be applied to the CC #1 and the CC #2 on which actual transmission is performed. If the channel occupancy of the eNB is applied to a different carrier except the CC #2, it means that it is able to indicate an LBT type capable of performing transmission when a CCA result is idle during prescribed time (e.g., 25 usec) for a UL transmission starting from an SF #7 (i.e., within a channel period occupied by the eNB). Or, if a UE recognizes that a difference between an end point of DL transmission and a start point of UL transmission is equal to or less than T usec (e.g., T=25), although category 4-based LBT type is indicated to the UE in response to the UL transmission, if a CCA result is idle during prescribed time (e.g., 25 usec), it means that the UE is able to change the category 4-based LBT type into an LBT type capable of being transmitted by the UE.

In Rel-14 eLAA system to which the present invention is applicable, when an eNB attempts to perform DL transmission including a UL grant only without PDSCH in LAA Scell, if less than 10% of UL transport blocks are successfully received only in response to the DL transmission, the eNB can increase DL CWS values corresponding to all priority classes.

The abovementioned method can be restrictively applied to a case that UL transmission is attempted using an LBT type capable of performing transmission when a CCA result is idle for prescribed time (e.g., 25 usec) within channel occupancy occupied by an eNB.

As mentioned in the foregoing description, when an eNB performs the type 2-1 multi-carrier LBT, although a plurality of carriers are included in a single carrier group, the eNB manages a single DL CWS value only according to each priority class and the eNB can adjust a DL CWS value based on HARQ-ACK of all carriers included in the carrier group. For example, if a ratio of NACK is equal to or greater than 80%, the eNB can increase DL CWS values corresponding to all priority classes.

In this case, when the eNB performs the type 2-1 multi-carrier LBT, as mentioned in the foregoing description, assume that the eNB channel occupancy is extensively applied to a plurality of carriers. In this case, when the eNB attempts to perform DL transmission including a UL grant only without PDSCH in LAA Scell, if less than 10% of UL transport blocks are successfully received only in response to the DL transmission, the eNB can increase DL CWS values corresponding to all priority classes (and/or if more than 10% of UL transport blocks are successfully received, the eNB can reset DL CWS values corresponding to all priority classes).

More specifically, when the eNB channel occupancy is applied to all CCs belonging to the same carrier group irrespective of an LBT result, if less than 10% of UL transport blocks scheduled on all carriers belonging to the carrier group are successfully received, the eNB can increase DL CWS values corresponding to all priority classes.

Or, when the eNB channel occupancy is applied to a carrier on which actual transmission is performed only, if less than 10% of UL transport blocks scheduled on an actually transmitted carrier(s) belonging to a carrier group are successfully received, the eNB can increase DL CWS values corresponding to all priority classes (and/or if more than 10% of UL transport blocks are successfully received, the eNB can reset DL CWS values corresponding to all priority classes). The abovementioned method can be restrictively applied to a case that UL transmission is attempted using an LBT type capable of performing transmission (or UL transmission indicated by the LBT type) when a CCA result is idle for prescribed time (e.g., 25 usec) within channel occupancy occupied by an eNB.

In summary, as shown in FIG. 13, the eNB performs DL LBT on a plurality of carriers and can transmit a DL signal on one or more carriers based on a result of the DL LBT performed according to each of a plurality of the carriers.

In this case, the eNB performs backoff-based LBT on a carrier (e.g., CC #2) among a plurality of the carriers and performs LBT for determining whether a carrier corresponding to more than prescribed time is idle on the remaining carriers (e.g., CC #1 and CC #3).

Subsequently, when the eNB transmits a DL signal including a UL grant without PDSCH (physical downlink shared channel) to one or more UEs during MCOT (maximum channel occupancy time) secured by the eNB, if less than 10% of UL transport blocks among UL transport blocks scheduled to the one or more UEs are successfully received, the eNB can increase a DL CWS (contention window size) corresponding to all DL LBT classes.

In this case, for example, the scheduled UL transport blocks may correspond to UL transport blocks scheduled to carriers on which a DL signal is actually transmitted by the eNB.

Or, as a different example, the scheduled UL transport blocks may correspond to UL transport blocks scheduled to a plurality of the carriers.

In addition, if more than 10% of UL transport blocks among UL transport blocks scheduled to the one or more UEs are successfully received, the eNB can reset a DL CWS corresponding to all DL LBT classes.

In particular, the operations above can be applied when the eNB indicates an LBT type attempting to transmit a UL signal when a channel corresponding to a DL signal including a UL grant without PDSCH is idle for prescribed time.

In Rel-14 eLAA system to which the present invention is applied, a method of triggering positions of UL subframes and/or a two-stage grant via a common PDCCH is applied. In this case, the UL subframes can be indicated using an offset value and a duration value from a subframe in which the common PDCCH is transmitted. A UE may not expect DL reception in a subframe indicated as the UL subframe. The two-stage grant corresponds to a UL grant configuration of two stages. Specifically, the two-stage grant corresponds to the entire configuration that an eNB provides all information except the timing at which PUSCH is actually transmitted to a UE via a first UL grant and schedules UL transmissions of a plurality of UEs via a second UL grant.

In this case, as shown in FIG. 13, if the eNB performs the type 2 multi-carrier LBT (LBT that allows transmission when a channel is idle during prescribed time (e.g., 25 usec) only like a CC #1) (for clarity, the LBT is referred to as category 2-based LBT)), indicating positions of UL subframes indicated by the eNB via a common PDCCH can be restricted in DL subframe(s) which is transmitted on a corresponding carrier after the LBT is performed. This is aimed for reducing ambiguity for an LBT type to be performed by a UE.

When a gap between an end point of DL transmission and a start point of scheduled PUSCH is equal to or less than 25 usec, although the scheduled PUSCH is scheduled by the category 4-based LBT, the UE can perform category 2-based LBT.

Or, when positions of UL subframes are indicated, if a start point and an end point of a scheduled PUSCH are included in the UL subframes, although the scheduled PUSCH is scheduled by the category 4-based LBT, it may allow the UE to perform category 2-based LBT.

In the aspect of a UE, if it fails to satisfy at least one of a first condition that a gap between an end point of DL transmission and a start point of scheduled PUSCH is equal to or less than 25 usec and a second condition that a start point and an end point of a scheduled PUSCH are included in the indicated UL subframes, it may not be preferable to change an LBT type of an eNB into the category 2-based LBT. According to the above-mentioned configuration, it may be able to reduce UE implementation complexity.

As a different embodiment, it may be able to configure the two-stage grant not to be triggered via a common PDCCH in DL subframe(s) which is transmitted on the carrier after the LBT is performed by the eNB.

Or, as shown in FIG. 13, when the eNB performs the type 2 multi-carrier LBT, if LBT (for clarity, Cat. 2 LBT) is performed only when a channel is idle for prescribed time (e.g., 25 usec) only like a CC #1, it may be able to indicate positions of UL subframes via a common PDCCH in DL subframe(s) which is transmitted on a corresponding carrier after the LBT is performed. Or, it may be able to allow the two-stage grant to be triggered via the common PDCCH in the DL subframe(s) which is transmitted on a corresponding carrier after the category 2 LBT is performed by the eNB. Yet, the abovementioned items can be permitted only when (a part of) conditions described in the following are satisfied.

When an eNB guarantees that a gap between an end point of DL transmission and a start point of scheduled PUSCH is to be within 25 usec.

When a start and an end of scheduled PUSCHs are included in positions of indicated UL subframes.

When an indicated LBT type of PUSCHs scheduled to positions of indicated UL subframes corresponds to category 2-based LBT.

Or, when end points of scheduled PUSCHs appear after the last subframe of indicated UL subframes, if an eNB performing the type 2 multi-carrier LBT performs the category 2-based LBT like the CC #1, it may be able to indicate positions of UL subframes via a common PDCCH in DL subframe(s) which is transmitted on a corresponding carrier after the LBT is performed by the eNB. Or, it may be able to allow the two-stage grant to be triggered via the common PDCCH in the DL subframe(s) which is transmitted on a corresponding carrier after the LBT is performed by the eNB.

The method has a merit in that it is able to trigger the two-stage grant on a carrier on which LBT (for clarity, cat. 2 LBT) is performed. The LBT allows a transmission to be performed when a channel is idle for prescribed time (e.g., 25 usec) only like the CC #1.

As mentioned in the foregoing description, in Rel-13 LAA system, as shown in Table 2, 4 channel access priority classes are defined in total. And, a length of a defer period, a CWS, MCOT (maximum channel occupancy time), and the like are defined according to each of the channel access priority classes. In particular, an eNB performs random backoff using parameters determined according to a channel access priority class. If the eNB accesses a channel after the random backoff, maximum transmission time is restricted.

In case of considering not only DL transmission but also UL transmission in an LAA system to which the present invention is applicable, it may also introduce a different LBT parameter (defer period, CWS, MCOT) according to a channel access priority class. Hence, it is necessary for an eNB to inform a UE of information on the LBT parameter.

It may be able to transmit a subframe of which a fore partial symbol or a latter partial symbol is emptied out from a subframe (including 14 symbols) in consideration of switching time from DL to UL (or switching time from UL to DL) and UL transmission via contiguous subframes. In this case, an eNB can inform a UE of a UL subframe.

As mentioned in the foregoing description, when new signaling for performing UL transmission in LAA Scell is introduced, the present invention proposes a method for an eNB to transmit the signaling to a UE in a UL unlicensed band.

3.6 Signaling Contents for UL LBT

First of all, signaling contents capable of being newly introduced to LAA Scell in consideration of UL transmission are explained in detail.

3.6.1 UL Grant-Related Signaling (1) LBT Parameter-Related

1) LBT type (1 bit): indicates one of a single CCA slot LBT and category 4 LBT

2) Backoff counter (N_bc bits): directly indicates a backoff counter value selected by an eNB 3) CWS (e.g., 2 bits): maps an accurate CWS value according to each state or indicates whether a CWS increases or decreases. The information can be replaced with signaling indicating a backoff counter value.

4) Priority class or MCOT (e.g., 2 bits)

5) Whether or not a reservation signal is transmitted (1 bit)

(2) Partial Subframe-Related

1) Subframe length (e.g., 2 bits): indicates one from among full/13 symbols/12 symbols/11 symbols 2) Initial partial subframe (1 bit): indicates whether or not PUSCH/PUCCH transmission is permitted by configuring a partial subframe (e.g., 7 symbols or 1 slot) configured by a shorter length when a UE fails to attempt to perform UL transmission at a start point of a designated subframe due to the failure of LBT (3) SRS-Related 1) Whether or not rate-matching is performed (1 bit): UE #2 indicates whether or not rate-matching is performed on PUSCH (or PUCCH) to be transmitted in LAA Scell in consideration of SRS transmission of UE #1

(4) PUSCH Transmission Timing-Related

1) Whether or not PUSCH is transmitted in a subframe appearing after a subframe (SF #n) in which a UL grant is transmitted (e.g., 2 bits): SF #n+4/SF #n+5/SF #n+6/SF #n+7

3.6.2 DL Grant-Related Signaling (1) Partial Subframe-Related

1) Subframe length (e.g., 2 bits): full/13 symbols/12 symbols/11 symbols, the subframe length is indicated for rate-matching of PUCCH to be transmitted in LAA Scell in a manner of corresponding to DL data 2) Initial partial subframe (1 bit): indicates whether or not PUSCH/PUCCH transmission is permitted by configuring a partial subframe (e.g., 7 symbols or 1 slot) configured by a shorter length when a UE fails to attempt to perform UL transmission at a start point of a designated subframe due to the failure of LBT (2) SRS-Related 1) Whether or not rate-matching is performed (1 bit): UE #2 indicates whether or not rate-matching is performed on PUSCH (or PUCCH) to be transmitted in LAA Scell in consideration of SRS transmission of UE #1

(3) PUCCH Transmission Timing-Related

1) Whether or not PUSCH is transmitted in a subframe appearing after a subframe (SF #n) in which a DL grant is transmitted (e.g., 2 bits): SF #n+4/SF #n+5/SF #n+6/SF #n+7

In the following, a PUSCH/PUCCH rate-matching-related signaling method for transmitting an SRS among the aforementioned signaling contents is explained in detail. Specifically, when a UE performs UL transmission during contiguous subframes, if a PUSCH/PUCCH rate matching for transmitting an SRS is performed in the middle of the contiguous subframes, discontinuous transmission occurs. In this case, due to the operation characteristic of an unlicensed band, the legacy UL transmission is terminated and it is necessary to perform LBT again. Hence, the present invention proposes a method of reducing inefficient resource utilization in consideration of the operation characteristic of the unlicensed band.

3.7 PUSCH/PUCCH Rate-Matching Related Signaling Method for Transmitting SRS

First of all, similar to a legacy LTE system, when SRS configuration exists in LAA Scell, a corresponding operation is explained.

3.7.1 Periodic SRS

Similar to the legacy LAA system, when a UE transmits an SRS in a periodic SRS subframe and does not transmit an SRS in the subframe according to SRS configuration without signaling indicating whether or not PUSCH/PUCCH rate-matching considering SRS transmission is performed while a DL grant and a UL grant are signaled, the UE can be configured to perform the PUSCH/PUCCH rate-matching and perform LBT again. However, scheduling restriction, which determines continuity of UL transmission based on the SRS configuration, may occur.

In order to compensate for the scheduling restriction, the present invention proposes a method that a UE autonomously determines whether to apply periodic SRS transmission. In this case, the UE may operate without signaling indicating whether or not PUSCH/PUCCH rate-matching considering SRS transmission is performed while a DL grant and a UL grant are signaled.

As a first modification example, when contiguous subframes are scheduled (or when contiguous subframes are scheduled via multi-subframe DCI), although a UE is configured to perform rate-matching on PUSCH/PUCCH transmission in the center subframe of the contiguous subframes by a periodic SRS configuration and a cell-specific SRS configuration, it may be able to configure the UE not to perform the rate-matching.

As a second modification example, it may be able to configure a UE to perform PUSCH/PUCCH rate-matching on a subframe in which information indicating the last subframe of UL transmission is received only based on a periodic SRS configuration and a cell-specific SRS configuration. Otherwise, it may be able to configure the UE not to perform the PUSCH/PUCCH rate-matching. In this case, the information indicating the last subframe of UL transmission can be transmitted via a common PDCCH in LAA Scell (e.g., indicate the number of subframes corresponding to UL from the current timing, indicates that a length of a subframe of specific timing corresponds to a partial subframe, or indicates that a new LBT parameter is updated). Or, the information indicating the last subframe of UL transmission can be transmitted via a UL grant (e.g., indicates that a length of a subframe of specific timing corresponds to a partial subframe, indicates that a new LBT parameter is updated, or indicates that LBT for transmitting a next subframe is performed).

3.7.2 Aperiodic SRS

Similar to the legacy LAA system, if a DL grant and a UL grant corresponding to an aperiodic SRS subframe trigger an SRS request bit, a UE transmits an aperiodic SRS. The UE does not transmit an SRS in the subframe by an SRS configuration. In this case, the UE can be configured to perform LBT again. Similar to the method mentioned earlier in the periodic SRS, in order to compensate for inefficient resource utilization, the present invention proposes a method that the UE autonomously determines whether to apply SRS configuration (without signaling indicating whether or not PUSCH/PUCCH rate-matching considering SRS transmission is performed among DL grant signaling and UL grant signaling).

As a first modification example, when contiguous subframes are scheduled (or when contiguous subframes are scheduled via multi-subframe DCI), although a UE is configured to perform rate-matching on PUSCH/PUCCH transmission in the center subframe of the contiguous subframes by an aperiodic SRS configuration and a cell-specific SRS configuration, it may be able to configure the UE not to perform the rate-matching. In other word, the UE does not perform the PUSCH/PUCCH rate-matching considering SRS transmission in the center subframe of the scheduled contiguous subframes and an SRS request bit of scheduling DCI of the center subframe may not be valid.

As a second modification example, it may be able to configure a UE to perform PUSCH/PUCCH rate-matching on a subframe in which information indicating the last subframe of UL transmission is received only based on an aperiodic SRS configuration and a cell-specific SRS configuration. Otherwise, it may be able to configure the UE not to perform the PUSCH/PUCCH rate-matching. In this case, the information indicating that a specific subframe corresponds to the last subframe of UL transmission can be transmitted via a common PDCCH in LAA Scell (e.g., indicate the number of subframes corresponding to UL from the current timing, indicates that a length of a subframe of specific timing corresponds to a partial subframe, or indicates that a new LBT parameter is updated). Or, the information can be transmitted via a UL grant (e.g., indicates that a length of a subframe of specific timing corresponds to a partial subframe, indicates that a new LBT parameter is updated, or indicates that LBT for transmitting a next subframe is performed).

3.7.3 Others Related to SRS

When SRS configuration identical to legacy configuration does not exist in LAA Scell, a corresponding operation is explained in the following.

When a UE is configured to transmit an SRS in all UL subframes or is configured to commonly transmit an SRS to all UEs attempting to perform transmission in a specific UL subframe, the UE is able to not empty out at least one symbol in consideration of SRS transmission of a different UE. Yet, in this case, SRS overhead considerably increases. Or, when a specific UE is configured to transmit an SRS only, a UE not transmitting an SRS can be configured to stop UL transmission in a corresponding subframe and perform LBT again. However, this method is also inefficient in terms of resource utilization. Hence, the present invention proposes a different method.

3.7.3.1 First SRS-Related Operation

When a UL partial subframe is configured, it may consider a subframe of which the last partial OFDM symbol is emptied out. In this case, it is able to determine SRS transmission and a PUSCH/PUCCH rate-matching pattern using a combination of signaling indicating a length of the subframe and an SRS request bit.

For example, if a subframe length corresponds to 12 symbols and an SRS request bit is triggered, 11-symbol PUSCH/PUCCH is configured and an SRS can be transmitted in a $12^{th}$ symbol.

As a different example, if a subframe length corresponds to 12 symbols and an SRS request bit is not triggered, 11-symbol PUSCH/PUCCH is configured and a UE does not attempt to transmit an SRS in a $12^{th}$ symbol. The UE can be configured not to perform LBT in consideration of SRS transmission of a different UE during the $12^{th}$ symbol.

As a further different example, if a subframe length corresponds to 12 symbols and an SRS request bit is not triggered, 12-symbol PUSCH/PUCCH is configured and a UE does not attempt to transmit an SRS in a $13^{th}$ symbol. The UE can be configured not to perform LBT in consideration of SRS transmission of a different UE during the $13^{th}$ symbol.

3.7.3.2 Second SRS-Related Operation

If an SRS request bit is triggered in DCI that schedules a UL subframe to be transmitted in an SF #n, a UE can be configured to transmit an SRS in the last symbol of an SF #n−1. In this case, the UE does not transmit an SRS in the last symbol of the SF #n and does not perform PUSCH/PUCCH rate-matching in the last symbol of the SF #n in consideration of SRS transmission of a different UE. Specifically, the operation above can be applied to the first subframe only among scheduled contiguous subframes (or a first subframe in which UL transmission is initiated after LBT is performed or a first subframe in which transmission is attempted after LBT is performed).

For example, when UL transmission is scheduled in an SF #n, an SF #n+1, and an SF #n+2, if an SRS request bit is triggered in SF #n UL transmission scheduling DCI and LBT is completed before the last symbol of an SF #n−1 is transmitted, a UE can transmit an SRS via the last symbol of the SF #n−1. If LBT of the UE is not completed before the last symbol of the SF #n−1 is transmitted, the UE may not transmit an SRS. If UL transmission starts from the SF #n+1 rather than the SF #n, although the SF #n+1 corresponds to the first subframe of contiguous subframes, since a 'first subframe in which transmission is attempted after LBT is performed' corresponds to the SF #n, it may be able to configure an SRS not to be transmitted in the last symbol of the SF #n.

The proposed method can be identically applied to a case that there is no (a)periodic SRS configuration. For example, it may be able to transmit an (a)periodic SRS in the last symbol of a subframe immediately before a first subframe of scheduled contiguous subframes (or a first subframe in which UL transmission is initiated after LBT is performed or a first subframe in which transmission is attempted after LBT is performed).

The proposed method can also be utilized for configuring transmission of contiguous subframes. For example, a UE newly performs LBT for a subframe in which an SRS request bit is triggered. If the SRS request bit is not triggered, the UE can transmit contiguous subframes without additional LBT.

3.7.3.3 Third SRS-Related Operation

If SRS configuration identical to the legacy SRS configuration does not exist in LAA Scell and whether to transmit an SRS is determined by dynamic signaling, it is necessary to have such a configuration as a bandwidth of the SRS, CS (cyclic shift), a comb type, and the like. As a method, it is able to signal related information such as an additional bandwidth, CS, a comb type, etc. by increasing a bit width of an SRS request bit. For example, if the SRS request bit is configured by 2 bits, '00' state indicates a state of not transmitting an SRS and '01', '10', and '11' states can indicate a state that SRS transmission information such as a bandwidth according to a state, CS, a comb type and the like are defined in advance or the SRS transmission information are provided via RRC signaling while an SRS is transmitted.

Or, a single SRS configuration (including SRS transmission information such as a bandwidth, CS, a comb type, etc.) according to a UE can be signaled via RRC or can be defined in advance (e.g., an SRS is always transmitted via the whole band). Or, information can be configured in advance and other information can be dynamically signaled depending on SRS transmission information. For example, information on an SRS bandwidth can be configured by the whole band in advance via RRC signaling while CS and a comb type are dynamically signaled.

3.7.3.4 Fourth SRS-Related Operation

Basically, the present invention assumes that a transmission structure of contiguous subframes assumed by an eNB is matched with a transmission structure of a UL subframe transmitted by a UE since there is no UL grant transmission/reception failure. However, in an actual wireless communication situation, a UE may fail to receive a UL grant. In this case, the UE may attempt to perform PUSCH/PUCCH rate-matching in a UL subframe not expected by the eNB or attempt to transmit an SRS.

For example, when UL transmission is scheduled to an SF #n, an SF #n+1, and an SF #n+2, if a UE fails to receive scheduling DCI on the SF #n+1, the UE regards the SF #n as the last subframe of the contiguous subframes and may attempt to perform PUSCH/PUCCH rate-matching or attempt to transmits an SRS in the SF #n using the aforementioned method or the signaling method.

In order to solve the problem, when PUSCH/PUCCH transmission is performed in LAA Scell in consideration of SRS transmission, a UE can be configured to perform puncturing rather than rate-matching. Specifically, when SRS transmission-related signaling is indicated via a method (e.g., common PDCCH) rather than the scheduling DCI, the puncturing method can be applied. Or, when SRS transmission-related signaling is indicated via LAA Scell, the puncturing method can be applied.

3.7.3.5 Fifth SRS-Related Operation

A field indicating a subframe in which PUSCH is transmitted on the basis of the timing (SF #n) at which a UL grant is transmitted and a field indicating a subframe in which PUCCH is transmitted on the basis of the timing (SF #n) at which a DL grant is transmitted correspond to self-carrier scheduling and cross-carrier scheduling. The field can be configured to be applied when a frame structure type of a scheduling cell corresponds to TDD only.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

4. Device Configuration

Figure 14:
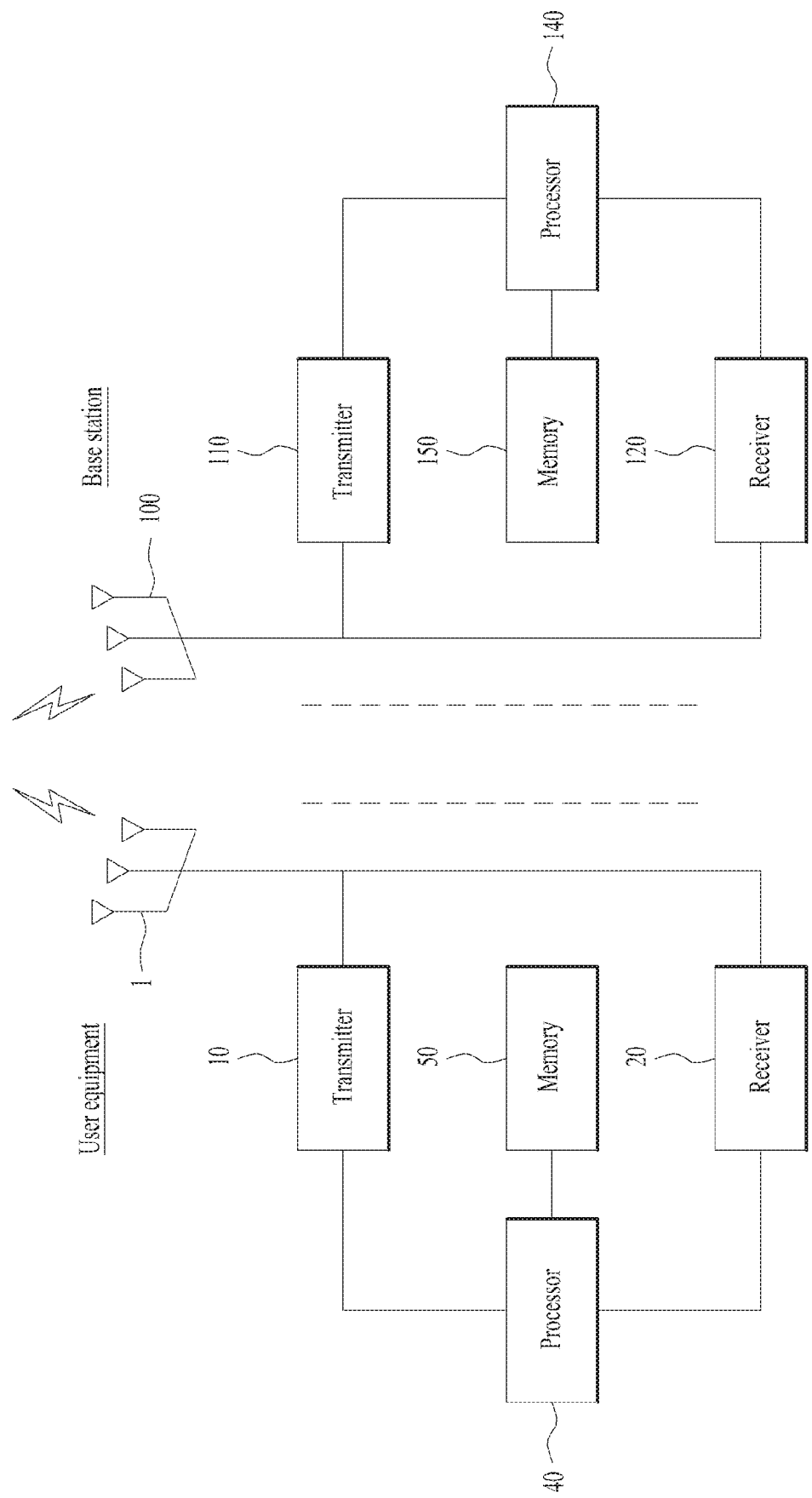
FIG. 14 is a diagram illustrating configurations of a UE and a base station in which proposed embodiments are implementable.

FIG. 14 is a diagram illustrating configurations of a UE and a base station capable of being implemented by the embodiments proposed in the present invention. The UE and the base station shown in FIG. 14 operate to implement the embodiments of a method of transmitting and receiving a signal between the UE and the base station and a method of adjusting an LBT parameter.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE receives first DL control information indicating whether a type of scheduling uplink signal transmission for one or more subframes corresponds to scheduling of a first type or scheduling of a second type from the base station via the processor 40. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 140. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS)

phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2680 or 2690 and executed by the processor 2620 or 2630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method for adjusting a downlink LBT (listen-before-talk) parameter by a base station (BS) in a wireless communication system supporting an unlicensed band, the method comprising:
    performing downlink LBT procedures for a plurality of carriers,
    wherein a first type downlink LBT procedure is performed for a single carrier configured for a primary secondary cell (pSCell) among the plurality of carriers and a second type downlink LBT procedure is performed for each of remaining carriers among the plurality of carriers;
    based on a result of the first type downlink LBT procedure and the second type downlink LBT procedure, transmitting, to one or more UEs, a downlink signal on one or more carriers during MCOT (maximum channel occupancy time) occupied by the BS; and
    increasing downlink CWS (contention window size) values corresponding to all downlink LBT priority classes based on less than 10% of uplink transport blocks scheduled to the one or more UEs being successfully received,
    wherein the first type downlink LBT procedure is a back-off counter based LBT procedure, and
    wherein based on the second type downlink LBT procedure, the downlink signal on one or more of the remaining carriers is transmitted when the one or more of the remaining carriers are in an idle state for more than a predefined time duration.

2. The method of claim 1, wherein the scheduled uplink transport blocks correspond to uplink transport blocks scheduled on the one or more carriers.

3. The method of claim 1, wherein the scheduled uplink transport blocks correspond to uplink transport blocks scheduled on the plurality of carriers.

4. The method of claim 1, wherein the BS resets the downlink CWS values corresponding to all the downlink LBT priority classes based on more than 10% of the uplink transport blocks being successfully received.

5. A base station (BS) configured to transceive a signal with a user equipment (UE) in a wireless communication system supporting an unlicensed band, the BS comprising:
    a receiver;
    a transmitter; and
    a processor configured to operate in a manner of being connected with the receiver and the transmitter,
    wherein the processor is further configured to:
    perform downlink LBT procedures for a plurality of carriers,
    wherein a first type downlink LBT (listen-before-talk) procedure is performed for a single carrier configured for a primary secondary cell (pSCell) among the plurality of carriers and a second type downlink LBT procedure is performed for each of remaining carriers among the plurality of carriers;
    based on a result of the first type downlink LBT procedure and the second type downlink LBT procedure, transmit, to one or more UEs, a downlink signal on one or more carriers during MCOT (maximum channel occupancy time) occupied by the BS; and
    increase downlink CWS (contention window size) values corresponding to all downlink LBT priority classes based on less than 10% of uplink transport blocks scheduled to the one or more UEs being successfully received,
    wherein the first type downlink LBT procedure is a back-off counter based LBT procedure, and
    wherein based on the second type downlink LBT procedure, the downlink signal on one or more of the remaining carriers is transmitted when the one or more of the remaining carriers are in an idle state for more than a predefined time duration.

6. The BS of claim 5, wherein the scheduled uplink transport blocks correspond to uplink transport blocks scheduled on the one or more carriers.

7. The BS of claim 5, wherein the scheduled uplink transport blocks correspond to uplink transport blocks scheduled on the plurality of carriers.

8. The BS of claim 5, wherein the BS resets the downlink CWS values corresponding to all the downlink LBT priority classes based on more than 10% of the uplink transport blocks being successfully received.

* * * * *